UNITED STATES PATENT OFFICE.

DANIEL M. LAMB, OF STRATHROY, CANADA.

IMPROVEMENT IN COMPOUND VULCANIZABLE GUMS.

Specification forming part of Letters Patent No. 144,622, dated November 18, 1873; application filed November 10, 1873.

*To all whom it may concern:*

Be it known that I, DANIEL MARTIN LAMB, of Strathroy, in the county of Middlesex and Province of Ontario, Canada, have invented a new and useful Improved Compound Vulcanizable Gum, of which the following is a specification:

My invention relates to an improvement on a vulcanizable gum described in Letters Patent heretofore granted to me; the same consisting of the inspissated juice of milkweed, or other plants possessing like properties.

My present improvement consists in the combination of ordinary caoutchouc with the milkweed gum before referred to, whereby the advantages of both are combined, and a superior gum for vulcanizing and general manufacturing purposes is obtained at a moderate cost.

In carrying out my invention, I prefer to obtain the asclepias gum in the manner described in another application filed simultaneously herewith, the gum being separated from the fiber of the weed (after curing and fermenting) by means of a solvent. The caoutchouc may also be dissolved, and then mingled with the other solution; or ordinary ground rubber may be added to the solution of asclepias gum. From ten to fifteen per cent. of caoutchouc added in this manner to the asclepias gum is found to increase its elasticity and make it, in all respects, equal to pure rubber. I am thus enabled to obtain a vulcanizable gum of the best quality, adapted for all purposes for which caoutchouc is now used, at a comparatively low cost.

I claim as new—

The compound vulcanizable gum herein described, consisting of caoutchouc with the inspissated juice of milkweed.

D. M. LAMB.

Witnesses:
   EDM. F. BROWN,
   OCTAVIUS KNIGHT.